United States Patent [19]

Baumgarten, Jr.

[11] 4,413,213

[45] Nov. 1, 1983

[54] ELECTRONIC MOTOR PROTECTION FOR VARIABLE SPEED MOTORS

[75] Inventor: Arthur A. Baumgarten, Jr., Manhattan Beach, Calif.

[73] Assignee: Reliance Electric Company, Cleveland, Ohio

[21] Appl. No.: 317,940

[22] Filed: Nov. 4, 1981

[51] Int. Cl.³ .................... G05B 5/00; H02H 5/04
[52] U.S. Cl. .................... 318/332; 318/310; 318/317; 318/449; 318/455; 361/30
[58] Field of Search ............ 361/23, 24, 25, 30, 361/31, 34, 79, 86, 87; 307/252 K; 318/309, 310, 317, 318, 332, 334, 449, 453, 455, 471, 474

[56] References Cited

U.S. PATENT DOCUMENTS

| | | | |
|---|---|---|---|
| 3,808,503 | 4/1974 | Hentschel | 361/30 |
| 3,912,976 | 10/1975 | Sons et al. | 361/31 |
| 3,931,559 | 1/1976 | McKee | 361/31 X |
| 4,151,450 | 4/1979 | Fukuma et al. | 361/31 X |
| 4,182,979 | 1/1980 | Douglas et al. | 318/332 X |
| 4,251,846 | 2/1981 | Pearson et al. | 361/30 |

*Primary Examiner*—Ulysses Weldon

[57] ABSTRACT

A motor protection circuit which generates a signal having a value proportional to the magnitude of the input current of the motor and a motor speed signal having a value proportional to the difference between the rated motor speed and the actual motor speed. The motor speed signal is multiplied by the input motor current proportional signal to derive a product signal. The product signal is summed with the input motor current proportional signal to derive a sum signal. The sum signal is compared with respect to a preset level to determine if it is greater than a preset level. If it is greater than a preset level, the sum signal is coupled to the input of a voltage controlled oscillator which generates an output signal having a value proportional to the magnitude of the sum signal. The output of the voltage controlled oscillator is counted in an up/down counter and an output is gated when the total count reaches a predetermined level.

8 Claims, 2 Drawing Figures

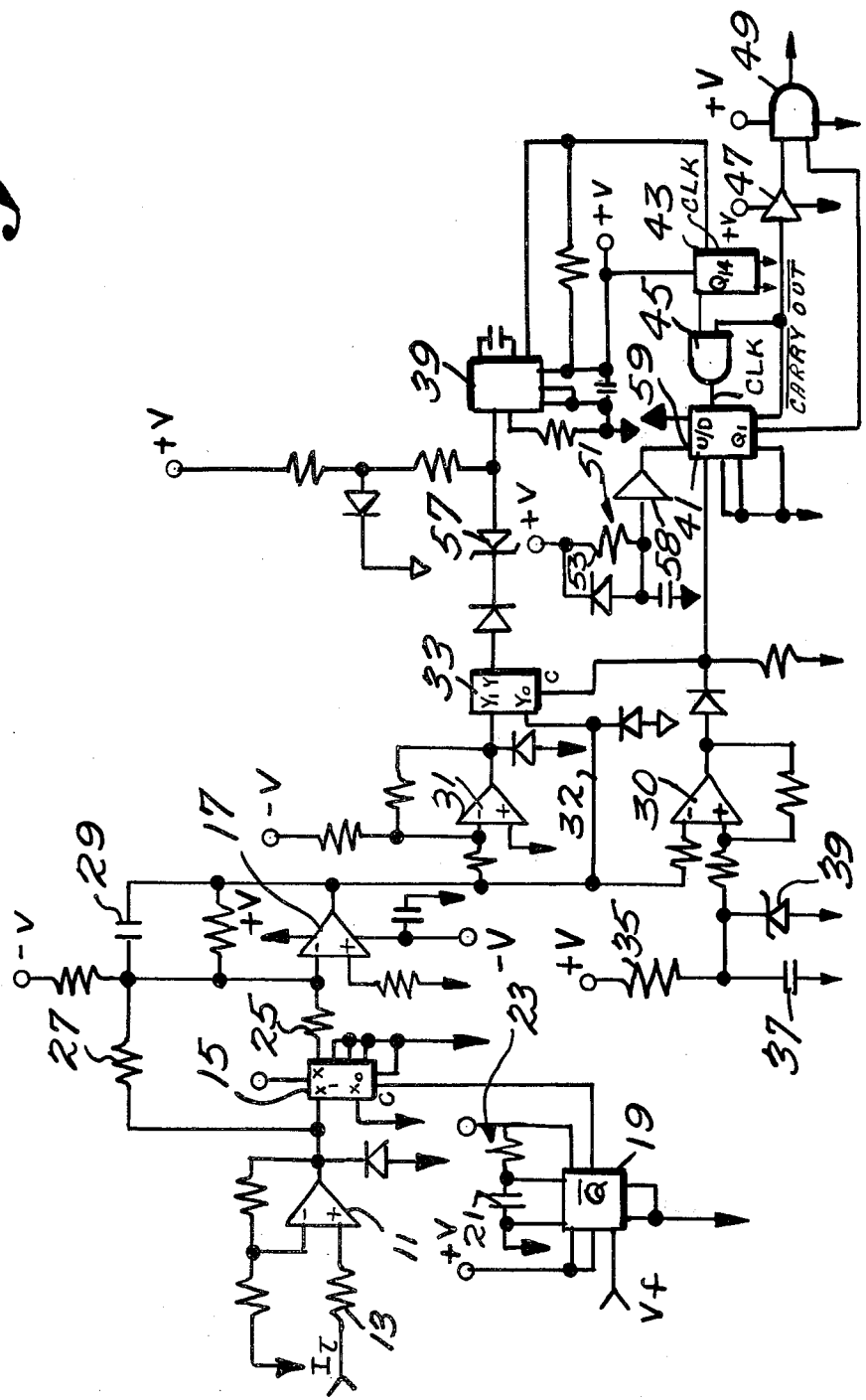

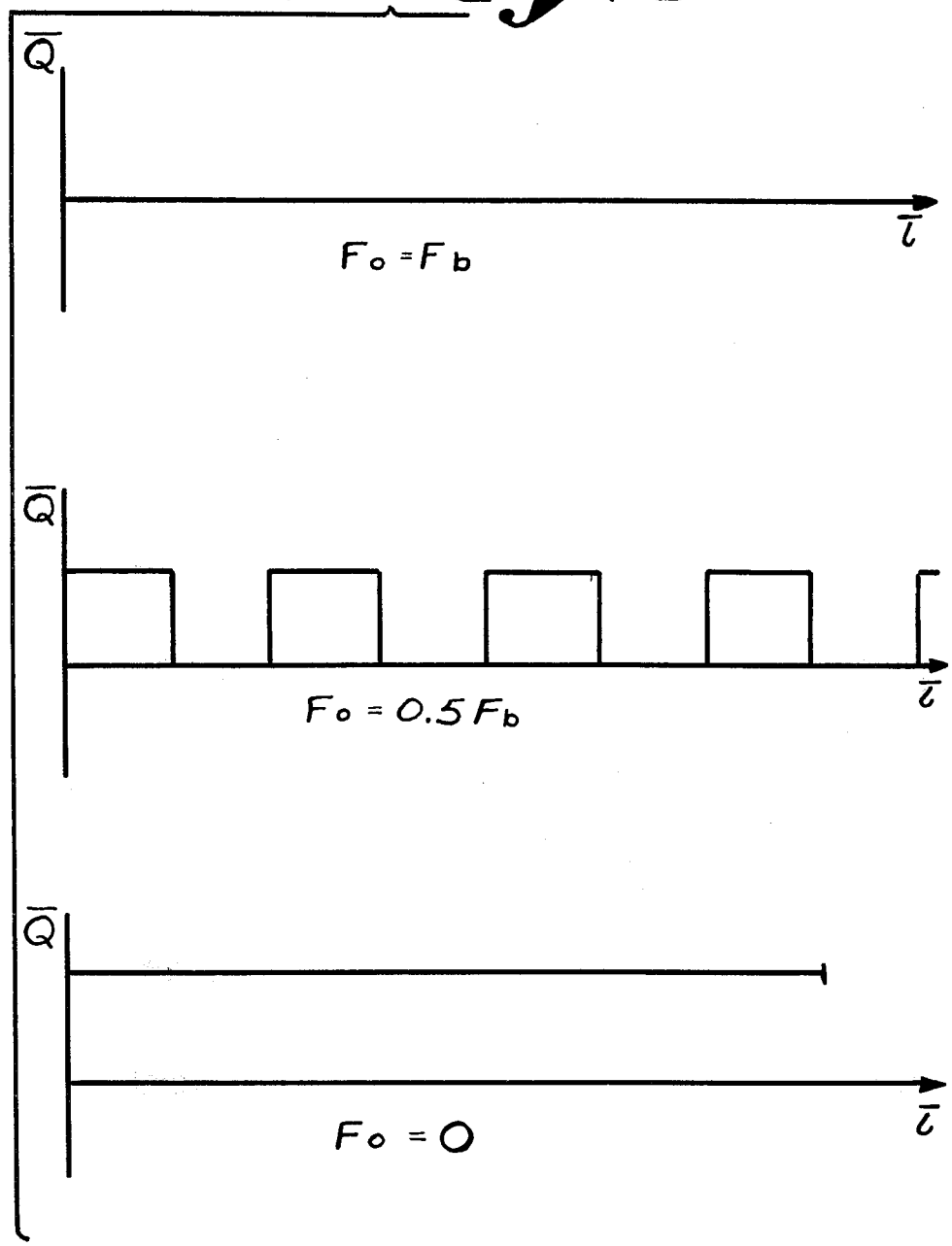

ELECTRONIC MOTOR PROTECTION FOR VARIABLE SPEED MOTORS

BACKGROUND OF THE INVENTION

This invention relates to a system for protecting electrically powered motors against thermal overload.

In the past thermal protection of electrically powered motors was derived by detecting motor current and when the time product of the motor current exceeded a predetermined threshold, the motor was shut down. An example of one such system for preventing thermal overload is disclosed in Linkus U.S. Pat. No. 3,821,602 wherein a fuse is positioned in circuit with each of the three phase windings of the motor. When the current overload exceeded a predetermined time-current product, as determined by the fuse characteristics, the fuse blew and the motor would be shut down. More recently, sophisticated techniques have been developed for determining the time-current product in AC motors. Thus, in Cameron U.S. Pat. No. 4,052,625 there is disclosed a current detection system which uses an SCR and a current sensing resistor for detecting the current flow into a DC motor. When the current exceeds a predetermined threshold as determined by a comparator, an output is provided to an integrating circuit. If the increased load current exists for a predetermined sufficient duration, a second comparator provides an output which deenergizes a control switch to shut off current to the motor.

It has been found, however, that thermal overload is dependent not only upon current input to the motor, but also, in a variable speed drive system, is dependent upon the level of fan cooling. When, for example, in an induction motor, a loss of fan cooling occurs, such as might happen when the motor is operating at reduced speeds, the level of current required to drive the motor into a thermal overload condition is reduced. Therefore, the prior art thermal overload protection circuits which assumed full speed fan cooling did not adequately protect such variable speed motors at reduced motor speeds.

Sons et.al. U.S. Pat. No. 3,912,976 discloses a circuit wherein the motor current values are determined and adjusted depending upon the speed of the motor. Thus at a first speed, the current itself is integrated with respect to time to determine whether the motor has reached its thermal overload stage. If the motor speed decreases below a predetermined level, a determination is made as to whether thermal overload has been reached at a lower current level. While this system is, in a general sense, sensitive to motor speed, it does not provide a control wherein the thermal overload level can be determined by continuously taking into consideration the variation of motor speed with respect to a predetermined rate of speed. Accordingly, there is a need for an improved motor protection system, particularly for variable speed motors.

SHORT STATEMENT OF THE INVENTION

The present invention, therefore, relates to a system for protecting motors such as variable speed motors from thermal overload. A signal having a value which corresponds to the RMS (root-mean-square) input current to the motor is generated. A second signal is generated having a value which corresponds to the variation of the motor input current frequency with respect to the rated frequency. The current level signal and the motor frequency related signal are multiplexed to derive a signal which depends not only on the input current to the motor, but also, to the motor speed. This signal is coupled to a summing circuit where it is summed with the current level signal. The sum signal is then compared with a predetermined threshold signal to determine if the summed signal exceeds a predetermined threshold level. If the summed signal exceeds this level, the sum signal is gated to a voltage controlled oscillator which generates a pulse train having a repetition rate which varies with the magnitude of the sum signal. The output of the voltage controlled oscillator is coupled to an up/down counter which counts up when the aforementioned threshold has been reached and counts down when it has not been reached. When the up/down counter reaches a predetermined count, an output is generated for shutting down the motor and/or generating an alarm signal.

BRIEF DESCRIPTION OF THE DRAWINGS

Other objects, advantages and features of the present invention will be more fully appreciated from the following detailed description of the preferred embodiment, the appended claims and the accompanying drawings in which:

FIG. 1 is a schematic illustration of the preferred thermal overload protection circuit of the present invention; and FIG. 2 is an illustration of a set of waveforms corresponding to the speed of the motor.

DETAILED DESCRIPTION OF THE PREFERRED EMBODIMENT

It is known that the thermal trip point for standard motor protection can be approximated over the range of 100% full load current as being the product of the full load RMS current taken to the fourth power and the total time at which the current exceeds the full load current level. If the proper offset and scaling factors, centered about 100% full load current, are used, a linear approximation can be made which is sufficiently accurate to determine when the motor is thermally overloaded. Accordingly, when the current exceeds full load current, the thermal trip point can be determined by multiplying it by the time during which the current exceeds full load value. This is the manner in which prior art thermal overload protection circuits operated.

However if an account of fan cooling is to be taken when determining thermal overload, the fan cooling factor must be determined. This can be readily determined for an induction motor because the input current frequency is proportional to motor speed. Thus the frequency of the input current to the induction motor can be detected in order to determine motor speed. For other types of motors, a motor speed detector would provide an indication of motor speed.

An equation for determining the approximate thermal overload level is set forth as follows:

$$X = IT(F_b/F_o) \tag{1}$$

Where X is the preset thermal trip point, I is the current value when it is in excess of the full load RMS current, T is the time during which the current is in excess of full load RMS current, $F_b$ is the base frequency or the frequency at which the motor is rated, and $F_o$ is the actual output frequency or speed of the motor.

This approximation assumes that no motor cooling exists at zero motor speed. In order to account for the fact that radiation, conduction and natural convection provide a significant fraction of motor cooling at reduced speeds, an additional term should be added. In fact, in the extreme case of zero motor speed, radiation, conduction and natural convection provide all of the motor cooling. If the total contribution of radiation, conduction and natural convection is large enough, it can be assumed that fan cooling is linear with speed. Thus the following equation for the thermal trip point X more closely approximates the actual thermal characteristics of a motor:

$$X = [KI(F_b - F_o)/F_b + I]T \qquad (2)$$

This can be rewritten as follows:

$$X = [K(F_b - F_o)/F_b + 1]IT \qquad (3)$$

Where K can be expressed as follows:

$$K = \frac{\text{rated speed cooling}}{\text{zero speed cooling}} - 1 \qquad (4)$$

Equation (3) describes the heating effect under overload conditions. Thus it can be seen that the thermal overload point is dependent on the input current level, the time the input current exceeds the full load rated current level and the amount the motor speed has varied from the base or rated motor speed.

Turn now to FIG. 1 which is a schematic illustration of the preferred embodiment of the motor protection circuit of the present invention. A first signal $I_t$ which is proportional to the total RMS input current to the motor is coupled to amplifier 11 via input resistor 13. The input current $I_t$ in a three phase, balanced system is the average RMS input current for the three phases. This is determined by summing the current values in each of the three phases and then dividing by three to derive the average RMS current for each phase.

If the aforementioned linear approximation for current is not sufficiently accurate for a given type of motor, the current signals can be processed by deriving the fourth power of each RMS current value for each phase, summing these values and then averaging the sum over the three phases. The resulting value of $I_t$ would then be coupled to amplifier 11.

The output of amplifier 11 is coupled to a two channel analog multiplexer/demultiplexer 15 which operates as a multiplier. The output of amplifier 11 is also coupled to the input of summing amplifier 17. In the preferred embodiment the two channel analog multiplexer/demultiplexer is a Motorola MC14053 unit but is should be appreciated that any such multiplexer/demultiplexer or direct multiplier could be utilized.

A one-shot multivibrator 19 receives an input signal $V_f$ which corresponds to the frequency of the input current to the motor. This frequency is designated $F_o$ and is a very close approximation of the actual ouput frequency or speed of the motor. The multivibrator is preferably a Motorola MC14538 unit and provides an output time pulse having a duration which depends upon the value of the capacitor 21 and the resistor 23. Thus each time an input pulse $V_f$ is provided to the clock input of the multivibrator 19, an output pulse is generated which has a time duration dependent upon the values of capacitor 21 and resistor 23. The $\overline{Q}$ output of the one-shot multivibrator is connected to the switching input of multiplexer 15. Thus when the value of the signal on input C to the multiplexer 15 is low, the output at the X terminal thereof corresponds to the input at the $X_o$ input thereof or zero since the $X_o$ input is grounded. When the input to the control terminal C of the multiplexer is high, the output at terminal X corresponds to that at the input terminal $X_1$, i.e., proportional to $I_t$.

Refer now briefly to FIG. 2 which is an illustration of the waveforms at the output of the one-shot 19 for various input frequencies of the signal $V_f$. Assume, for example, that the input frequency $F_o$ is the same as the rated operating frequency of the motor. When this occurs the monostable multi-vibrator 19 generated output pulses at the Q output thereof at a rate which causes the Q output to remain high continuously. Accordingly, the $\overline{Q}$ output is continuously low as illustrated in FIG. 2(a). Thus when this occurs the multiplexer 15 provides a low output by connecting the signal on the $X_o$ input therethrough to the output X. When, for example, the frequency $F_o$ is one-half of the rated frequency $F_b$ of the motor, the Q output will be high for a predetermined period of time which is proportional to the difference in frequency between the rated frequency $F_b$ and the output frequency $F_o$ as illustrated in FIG. 2(b). Accordingly, the output of the multiplexer 15 will be the same as the current proportional signal $I_t$ at the output of amplifier 11 for part of the time and will be zero for part of the time. As can be seen, as the output frequency $F_o$ decreases with respect to the rated operating frequency $F_b$ of the motor, the total time during which the multiplexer conveys the input $I_t$ at terminal $X_l$ through to the output X increases.

Referring back to FIG. 1, the output of the multiplexer 15 is coupled to the summing amplifier 17 via input resistor 25. The relative values of input resistors 25 and 27 are set so that the ratio of resistor 27 to resistor 25 is equal to the factor K as defined by equation (4). For example, if full speed fan cooling is twice that of zero speed cooling, then the value of resistor 27 would be the same as resistor 25.

Operational amplifier 17 is connected in a conventional manner as illustrated and has a capacitor 29 connected thereacross for averaging the output of multiplexer circuit 15. Thus the waveform at the output of the multiplexer 15 is either $I_t$ or zero depending upon the control signal from one-shot 19. Capacitor 29 serves to average this "chopped" output of the multiplexer 15.

The output of the amplifier 17 is proportional to the quantity $$I_t[K(F_b - F_o)/F_b + 1] \qquad (5)$$

where as aforementioned K is the ratio of resistor $R_{27}$ to $R_{25}$, $F_b$ is the rated speed of the motor being protected, $F_o$ is the actual detected speed of the motor, and $I_t$ is the input current to the motor which in the case of a three phase motor is average over the three phases of the motor. The output of amplifier 17 is coupled to a comparator 30 and to an inverting amplifier 31. Amplifier 31 serves to invert the output of the operational amplifier 17. Accordingly, in the preferred embodiment, amplifier 31 is set for unit gain. The output of amplifier 31 is connected to the $Y_l$ input of the multiplexer 33. The other input to the multiplexer 33 at terminal $Y_o$ is dervied directly from the output of the amplifier 17 and is inverted with respect to the output of amplifier 31.

Multiplexer 33 may be of the same type as multiplexer 15.

A circuit consisting of resistor 35, a capacitor 37 and a Zener diode 39 establishes a voltage at one input of the comparator 30. The voltage level established by the Zener diode can be any level desired depending upon the thermal overload point of the motor being protected. However, in the preferred embodiment, this voltage level is set at 5.1 volts. It is this voltage level with which the output of amplifier 17 is compared to determine whether the motor input current level as modified by the relative motor speed is greater than or less than a predetermined maximum value. If the result of equation 5, i.e.

$$I_t[K(F_b - F_o)/F_b + 1] \qquad (5)$$

is less than a predetermined level, comparator 30 which has a very high gain, and hence is overdriven, will generate a low output which will cause up/down counter 41 to count down. However, if the result of equation 5 is greater than the predetermined level, the output of the comparator 30 will go high thereby causing the up/down counter 41 to count up. When the up/down counter reaches a predetermined count, a sustained overload output signal is generated for shutting down the motor.

Turning now to amplifier 31 as aforementioned, it is set at unity gain so that it serves as an inverter. The output of amplifier 31 is coupled to the analog multiplexer 33 at its $Y_I$ input. The other input to the multiplexer 33 is derived directly from the output of the amplifier circuit 17. Thus the two inputs to the multiplexer 33 are the same signals with the exception that one signal is inverted with respect to the other. The control input to the multiplexer 33 is derived from the output of comparator 30. When the output of the comparator 30 is high, the inverted output from amplifier 31 is coupled through the multiplexer 33 to a clock generator 39. When the output of the comparator 30 is low, the direct output of the amplifier 17 is coupled via line 32 and the multiplexer 33 to the clock pulse generator circuit 39. These signals are coupled to the clock pulse generator circuit 39 via Zener diode 57.

In operation, when the output of the amplifier 17 is greater than 5.1 volts, the output of the amplifier is coupled through the multiplexer 33 via the Zener diode 57 to the clock circuit 39. On the other hand, when the output of the amplifier circuit goes below 5.1 volts, the inverted output of amplifier 17 is coupled by the multiplexer 33 to the clock pulse generator 39 and hence the input thereto is low as assured by the Zener diode 57. Accordingly, pulses at a low repetition rate are generated at the output of the clock pulse generator 39.

The clock pulse generator 39 is a voltage controlled oscillator having an output pulse repetition rate which is proportional to the input voltage thereto. Thus, the higher the output of the amplifier 17 circuit goes above the 5.1 volt level, the greater is the frequency of the output of the oscillator 39. The oscillator output is coupled to a 14 bit binary counter 43, the purpose of which is to divide the output of the clock pulse generator by a factor which depends upon the up/down counter utilized. The output of the binary counter or divider 43 is connected to an AND gate 45, the output of which in turn is coupled to the clock input of the up/down counter 41.

When the U/D input to the up/down counter 41 is high, the up/down counter will count up. At the Q1 output of the up/down counter, a pulse train will be generated which is at one-half the input frequency of the clock signal at the clock input of the up/down counter. When the maximum count of the up/down counter is reached, which in the present case for a Motorola MC14516B is 16, the $\overline{\text{CARRY OUT}}$ output will go low thus inhibiting AND gate 45 from any further gating of clock pulses to the up/down counter 41. This low going $\overline{\text{CARRY OUT}}$ signal will also be inverted by inverter 47 and coupled to AND gate 49. AND gate 49 will thereby be enabled to provide a high output which indicates that an overload condition has been reached requiring shut-off of the motor, or in the alternative an alarm sounding.

The up/down counter 41 is reset by means of circuit 51. This circuit includes resistor 53, capacitor 35 and Schmidt trigger 58 which squares up the signal coupled to the reset input 59 of the up/down counter 41. The purpose for this circuit is to initially establish a reset condition when the system is started up.

The present invention provides an improved system for determining the thermal overload condition of a motor by detecting both motor input current and speed. Thus, more accurate control of the thermal overload condition of a motor on a continuous basis is achieved over that heretofore known in the art. While the present invention has been disclosed in connection with a preferred embodiment thereof, it should be appreciated that other embodiments may be utilized which fall within the spirit and scope of the invention as defined by the appended claims.

What is claimed is:

1. A motor protection circuit comprising:
   means for generating a motor current signal having a value proportional to the magnitude of the input current to said motor;
   means for generating a motor speed signal having a value proportional to the difference between the rated motor speed and the actual motor speed;
   means responsive to said motor current signal and said motor speed signal for generating a product signal having a value proportional to the product of said motor speed signal and said motor current signal;
   means for summing said motor current signal and said product signal;
   means for determining if said product signal is greater than a preset level;
   means responsive to said determining means for generating a clock pulse train when said product signal exceeds said preset signal, said product signal having a frequency proportional to said product signal level; and
   counter means responsive to said clock pulse train when said sum signal exceeds said preset signal for counting said clock pulses, said counter generating a control output signal when said count reaches a predetermined level.

2. A motor protection circuit comprising:
   means for generating a motor current signal having a value proportional to the magnitude of the input current to said motor;
   means for generating a motor speed signal having a value proportional to the difference between a predetermined normal operating speed for said motor and the actual motor speed;

means responsive to said motor current signal and said speed signal for generating a product signal having a value proportional to the product of said speed signal and said motor current signal;

summing means for generating a sum signal proportional to the sum of said product signal and said motor current signal;

means for determining if said sum signal is greater than a preset level;

means responsive to said determining means for generating a clock pulse train when said product signal exceeds said preset signal, said clock pulse train having a repetition rate proportional to said sum signal level; and counter means responsive to said clock pulse train when said sum signal exceeds said preset signal for counting said clock pulses, said counter generating an output when said count reaches a predetermined level.

3. A motor protection circuit comprising:

means for generating a motor current signal having a value proportional to the magnitude of the input current to said motor;

means for generating a motor speed signal having a value proportional to the difference between the highest normal operating speed of said motor and the actual motor speed;

means responsive to said motor current signal and said speed signal for generating a product signal having a value proportional to the product of said speed signal and said motor current signal;

summing means for generating a sum signal proportional to the sum of said motor current signal and said product signal;

comparator means for determining if said product signal is greater than a preset level;

a clock pulse generator for generating an output clock pulse train having a repetition rate proportional to an input signal thereto;

means for gating a signal proportional to said sum signal to the input of said clock pulse generator when said sum signal is greater than said preset level;

integrating means for counting up the pulses generated by said clock pulse generator when said sum signal is greater than said preset level and for counting down said pulses generated by said clock pulse generator when said sum signal is less than said preset level, said counter generating an output pulse when said count reaches a predetermined level; and means responsive to said output of said integrating means for controlling said motor.

4. A motor protection circuit comprising:

means for generating a motor current signal having a value proportional to the magnitude of the input current to said motor;

means for generating a motor speed signal having a value proportional to the difference between a predetermined operation speed of said motor and the actual motor speed;

means responsive to said motor current signal and said speed signal for generating a product signal having a value proportional to the product of said speed signal and said motor current signal;

summing means for generating a sum signal proportional to the sum of said motor current signal and said product signal;

comparator means for determining if said product signal is greater than a preset level;

a voltage controlled oscillator for generating an output clock pulse train having a repetition rate proportional to the input signal thereto;

means for gating a signal proportional to said sum signal to the input of said voltage controlled oscillator when said sum signal is greater than said present level, and for gating a low signal to said voltage control oscillator when said sum signal is less than said preset level;

means for counting up the pulses generated by said voltage control oscillator when said sum signal is greater than said preset level and for counting down said pulses generated by said voltage controlled oscillator when said sum signal is less than said preset level, said counter generating an output pulse when said count reaches a predetermined level; and means responsive to the output of said counting means for controlling said motor.

5. The motor protection circuit of claim 4 wherein said means for generating a motor speed signal having a value which is proportional to the difference between a preselected operating speed of said motor and the actual motor speed comprises a monostable multivibrator having a predetermined output pulse width and being clocked by a signal having a frequency proportional to the actual motor speed, said monostable multivibrator generating an output having a value which is proportional to the difference between the selected operating speed of said motor and the actual motor speed.

6. The motor protection circuit of claim 5 wherein said means for generating a product signal comprises a gating circuit for gating said motor current signal to said summing means for a portion of each of a series of time increments dependent upon the output of said monostable multivibrator.

7. The motor protection circuit of claims 5 or 6 wherein said voltage controlled oscillator further includes a divider for reducing the repetition rate of the clock pulse train generated by said voltage controlled oscillator.

8. The motor protection circuit of claim 4 further comprising reset means for said counting means.

* * * * *